Figure 1:
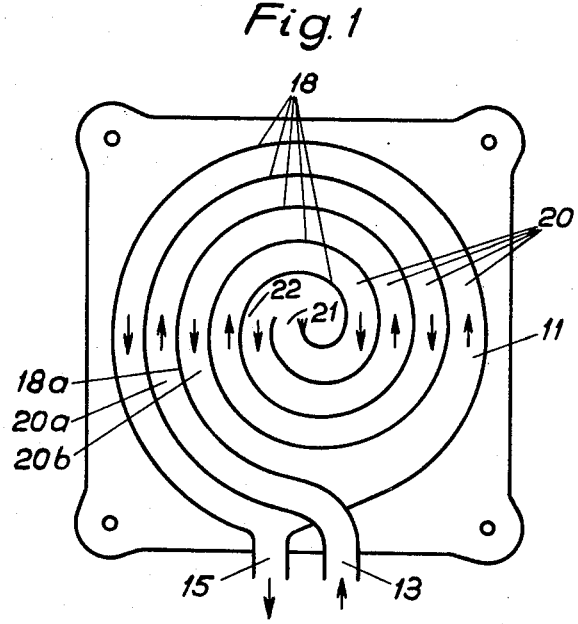

March 11, 1969  O. VON KRUSENSTIERNA ETAL  3,432,353
FUEL CELL ELECTRODE
Filed Feb. 28, 1966

INVENTORS
Otto von Krusenstierna
Ingemar Lindholm
Gunnar Malmberg
By
Bailey, Stephens + Huettig
ATTORNEYS United States Patent Office 3,432,353
Patented Mar. 11, 1969

3,432,353
FUEL CELL ELECTRODE
Otto von Krusenstierna, Stockholm, and Ingemar Lindholm and Gunnar Malmberg, Vasteras, Sweden, assignors to Allmänna Svenska Elektriska Aktiebolaget, Vasteras, Sweden, a Swedish corporation
Filed Feb. 28, 1966, Ser. No. 530,448
Claims priority, application Sweden, Mar. 3, 1965, 2,724/65
U.S. Cl. 136—86        9 Claims
Int. Cl. H01m 21/04, 27/02

A fuel cell battery generally consists of a number of anode, cathode, cooling and sealing elements, which are stacked to form a battery. An element may consist of a centrally arranged active part, preferably in the form of a plate which is fixed in a surrounding frame, for example of plastic. The frames of the elements are provided with holes extending in the stacking direction. These holes, together with sealing elements arranged between the holes and forming continuous connections with the holes, serve as channels for the supply of fuel, oxidant and coolant to those interstices between the elements to which the respective agent is to be supplied. For sealing outwardly sealing rings are usually arranged between the plastic frames immediately inside their outer edges. The elements are kept together in one unit, for example by means of end plates, which are connected with each other by means of long bolts. In a battery of this type adjacent to an active electrode element there is a space in the form of an interstice, to which fuel or oxidant is supplied. The electrolyte is on the other side of the electrode element.

Electrodes are also known which are provided with two active electrode elements which limit a space arranged between them, that is in the electrode, for the supply of fuel or oxidant. In this case the electrolyte is arranged on both sides of the electrode, that is outside the two active electrode elements.

The fuel or the oxidant which is usually supplied continuously is partially consumed during the passage of the active electrode elements, before it is carried away from the space in question.

Through the use of the present invention it has been proved possible to effect considerably more compact cell constructions than those known previously. This is due to improved cooling and the more favourable temperature distribution in the fuel and oxidant spaces which is achieved with the device according to the invention. At the same time there is the advantage that losses of power due to voltage drops over the different fuel and oxidant spaces is considerably smaller. In the use of fuel or oxidant mixtures containing an inert component, for example hydrogen containing nitrogen, dead areas in the electrode space in question, caused by concentration of inert components, are also avoided according to the invention.

The invention relates to a fuel cell electrode with a space arranged for a medium reacting at the electrode in the form of a fuel or an oxidant, which electrode is provided with an inlet and an outlet for a medium supplied to the space and partially consumed during the flowing passage of the space. It is characterised in that the space is divided into two channels running side by side and lying in the same plane, which are separated by intermediate walls, the medium on both sides of each intermediate wall being arranged to flow in opposite directions in relation to said intermediate wall and in that the first end of the first channel constitutes the inlet for the medium and the second end of the first channel is connected to the first end of the second channel, whose second end constitutes the outlet for the medium. The connection between the second end of the first channel and the first end of the second channel is preferably positioned in the central part of the electrode.

In an advantageous embodiment of the invention, the channels have the shape of two spirals running side by side and lying in the same plane, one end of one spiral constituting the inlet for the medium and its other end connecting with the one end of the other spiral, whose remaining end constitutes the outlet for the medium. The spirals do not need to be circular. They can, among other things, be square, rectangular or triangular.

According to another embodiment of the invention, the space arranged at the electrode is limited sideways by an active electrode element and the one side of a limiting wall substantially parallel to the active electrode element, the space being arranged to be supplied with fuel and another corresponding space is arranged on the other side of the limiting wall between this and another active electrode element, this second space being arranged to be supplied with oxidant. The electrode surfaces may then with advantage be electrically connected through the intermediate walls and possibly also through the limiting walls, since this entails a lower voltage drop by series connection of the elements. The electrolyte is arranged on the outer sides of the electrode elements.

According to a further embodiment the space arranged at the electrode is limited sideways by an active electrode element and the one side of a limiting wall substantially parallel to the active electrode element, the space being arranged to be supplied with medium of a certain type, for example fuel and another corresponding space is arranged on the other side of the limiting wall, between this and another active electrode element, this second space being arranged to be supplied with medium of the same type. The electrode elements are electrically insulated from each other by the intermediate walls and/or the limiting walls, if they are connected in series with each other. The electrolyte is arranged on the outer sides of the electrode elements.

In many cases it is suitable to fix the intermediate walls to the electrode elements and/or the limiting walls, since it has been proved that the mechanical stability of the fuel cell electrode is then considerably increased.

The said medium, whether it is a fuel or an oxidant, can be gaseous or liquid. The fuel can, for example, be hydrogen, methanol or hydrazine. Examples of oxidants are oxygen, air, halogen and hydrogen peroxide. The electrodes have porous, active electrode elements which may be manufactured, for example, by sintering of powder particles. A well-known sintered porous electrode type of this kind, which is arranged in contact with fuel, contains nickel in activated form. On the oxidant side, for example, a sintered porous electrode with activated silver as the active component can be used.

A water solution of potassium hydroxide is an electrolyte often used, at least if hydrogen is used as fuel and oxygen as oxidant.

Figure 2:
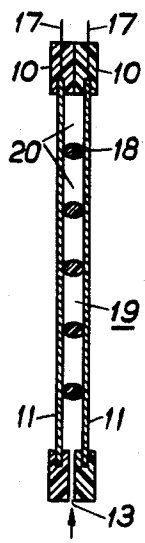
Figure 3:
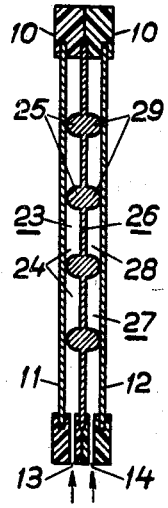
Figure 4:
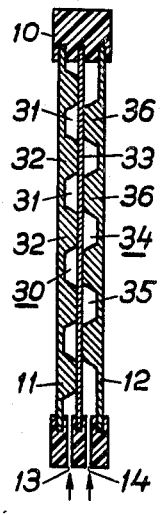
Figure 5:
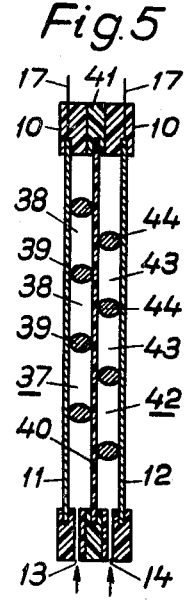

The invention will be explained in more detail by the description of a number of embodiments with reference to the accompanying drawings, in which FIG. 1 shows in front view an active electrode element in a fuel cell electrode with spiral-shaped intermediate walls, from which a limiting wall or another active electrode element has been removed in order that the intermediate walls may be visible, FIG. 2 shows the same fuel cell electrode in cross section from the side, FIGS. 3, 4 and 5 show fuel cell electrodes according to the invention with different intermediate walls and limiting walls in section from the side.

In the figures, 10 denotes a frame of plastic or another insulating material in which active electrode elements, for example fuel electrode elements 11 or oxidant electrode elements 12, are fixed. The inlet for the medium to the active electrode element is denoted 13 if the medium is a fuel and 14 if the medium is an oxidant. The outlet is in a corresponding way denoted 15 and 16 respectively. If there are any current terminals from the electrode elements, these are denoted 17. The electrode elements according to FIGS. 2 and 5 which are provided with current terminals may be connected in parallel to other electrode elements of the same type, for example fuel electrode elements, or in series with electrode elements of opposite type, that is oxidant electrode elements, in other electrodes. The electrodes according to FIGS. 3 and 4 which do not have current terminals may constitute series connected units in a battery with several electrodes.

The fuel cell electrode according to FIG. 1, which in the case described is assumed to comprise two fuel elements 11 but which could equally well consist of two oxidant elements, has intermediate walls 18 of a plastic, for example, polypropene, or of an elastomer, for example, rubber. These intermediate walls may be loose with a close contact to the elements 11 or glued to the elements 11. As is evident from FIG. 2, the intermediate walls divide the fuel space 19 limited outwardly by the two frames 10 into channels 20, which have the form of two spirals running side by side and lying in the same plane, the first end of the first spiral constituting the inlet 13 for the medium, that is in the described case the fuel and its second end 21 connecting the first end 22 of the second spiral, whose remaining end constitutes the outlet 15 for the medium. As is evident from the arrows in FIG. 1, the intermediate walls 18 are arranged so that the medium on both sides of an intermediate wall, for example 18a, flows in opposite directions in relation to the intermediate wall and so that the medium in its flowing path through the space on the one side 20a of the intermediate wall at least substantially is at the same distance from the inlet 13 as the medium on the other side 20b of the intermediate wall is from the outlet 15.

In FIG. 3 the fuel space is denoted 23, its channels 24 and its intermediate walls 25. The fuel space 23 is limited on the side by the fuel electrode element 11 and by the limiting wall 26 and outwardly by the two frames 10. The oxidant space 27 has channels 28 and intermediate walls 29. It is limited sideways by the limiting wall 26 and the electrode element 12 and outwardly by the two frames 10. The body consisting of the parts 25, 26 and 29 is manufactured in one piece of conducting material, for example nickel.

In FIG. 4 the fuel space is denoted 30, its channels 31 and its intermediate walls 32. The intermediate walls comprise coherent parts of the electrode element 11 and are manufactured in one piece with the element. They have the form of ridges running on the element. The fuel space 30 is limited sideways by the electrode element 11 and by the limiting wall 33 of conducting material, for example a homogeneous nickel disc which can be welded to the electrode elements 11 and 12 or be loose and in close contact with them. The oxidant space 34 has the channels 35 and the intermediate walls 36. It is limited sideways by the limiting wall 33 and the electrode element 12. The space 30 as wall as the space 34 is outwardly limited by the single frame 10, in which the electrode elements 11 and 12 as well as the limiting wall 33 are fixed.

In FIG. 5 the fuel space is denoted 37, its channels 38 and the intermediate walls 39, which may be of insulating material, for example of the same type as described for the intermediate walls 18 in the device according to FIGS. 1 and 2. They may also be of conducting material, for example of nickel. The fuel space 37 is limited sideways by the electrode element 11 and by the limiting wall 40 of insulating material, such as a plastic, for example polypropene or an elastomer, for example rubber. The limiting wall 40 is fixed in the frame 41 situated between the two frames 10 and of the same material as the frames 10. Outwardly the fuel space is limited by the left frame denoted 10 and by the frame 41. The oxidant space 42 has the channels 43 and the intermediate walls 44 of the same type as the intermediate walls 39. It is limited sideways by the electrode element 12 and by the limiting wall 40 and outwardly by the right frame denoted 10 and by the frame 41.

When, as is the case with the devices according to FIGS. 2, 3 and 5, two or more frames lie close to each other, sealing between them may be effected, for example by melting together the frames at the contact surfaces if the material consists of a thermoplastic, or by gluing the frames or by arranging special sealing rings between them.

In the devices according to FIGS. 3 and 4, where the electrode elements 11 and 12 are connected electrically with each other through intermediate walls 25, 29 (FIG. 3) and through the limiting wall 26 (FIG. 3) and 33 (FIG. 4) the advantage is obtained that the voltage losses over the spaces 23, 27, and 30, 34, respectively are reduced very much by the many contact points between the electrode elements, the current path then being greatly shortened.

We claim:
1. In a fuel cell comprising a pair of spaced electrode elements defining a space for a medium reacting at the electrode elements in the form of a fuel or an oxidant, the improvement in which said space is provided with an inlet and an outlet for a medium supplied to the space and partially consumed during its passage through the space, and means dividing the space into two channels running side by side and lying in the same plane, said dividing means comprising intermediate walls, the medium on both sides of each intermediate wall flowing in opposite directions in relation to said intermediate wall, the first end of the first channel constituting the inlet for the medium, the second end of the first channel being connected to the first end of the second channel, the second end of the second channel constituting the outlet for the medium.

2. In a fuel cell according to claim 1, the second end of the first channel being connected to the first end of the second channel in the central part of the electrode.

3. In a fuel cell according to claim 1, the channels having the shape of spirals.

4. In a fuel cell according to claim 1, a first active electrode element limiting the space at one side and a limiting wall substantially parallel to the first active electrode element one side of which limits the other side of the space means to supply fuel to the space, means including a second side of the limiting wall and a second active electrode element defining a second space means to supply oxidant to the second space, the second space having means therein forming passages in which the oxidant flows in opposite directions in adjacent portions of the passages.

5. In a fuel cell according to claim 4, the first and second electrode elements being electrically connected to each other through the intermediate walls.

6. In a fuel cell according to claim 4, the first and second electrode elements being electrically connected to each other through the limiting wall.

7. In a fuel cell according to claim 1, a first active electrode element limiting the space at one side and a limiting wall substantially parallel to the first active electrode element, one side of which limits the space at the other side, means to supply a fluid medium to the space, means including a second side of the limiting wall and a second active electrode element defining a second space, means to supply a fluid medium of the same kind.

8. In a fuel cell according to claim 7, first and second electrode elements being electrically insulated from each other by some of said walls.

9. In a fuel cell according to claim 1, space being limited sidewise by at least one active electrode element and the intermediate walls comprising coherent parts of the electrode element.

References Cited

UNITED STATES PATENTS

| | | | |
|---|---|---|---|
| 1,036,609 | 8/1912 | Grosvenor | 23—288 XR |
| 2,969,315 | 1/1961 | Bacon | 136—120 |
| 3,101,285 | 8/1963 | Tantram et al. | 136—120 |
| 3,234,050 | 2/1966 | Beltzer et al. | 136—86 |
| 3,259,524 | 7/1966 | Fay et al. | 136—86 |

WINSTON A. DOUGLAS, *Primary Examiner.*

A. SKAPARS, *Assistant Examiner.*

U.S. Cl. X.R.

136—120